3,122,439
COFFEE ROASTING
Robert V. MacAllister, Clinton, Iowa, and Clifford Henry Spotholz, Montvale, N.J., assignors to General Foods Corporation, White Plains, N.Y., a corporation of Delaware
No Drawing. Filed Oct. 2, 1962, Ser. No. 227,718
3 Claims. (Cl. 99—68)

This invention relates to the rapid roasting of green coffee beans in order to increase acidity under conditions which, by comparison with conventional roasting, produce a roasted coffee at a substantially increased roasting rate.

In brief, the invention comprises roasting green beans by means of a short-time high-temperature roast using hot air or other suitable gaseous material. In particular, hot air at temperatures up to 900° F. may be passed through the beans for roasting times as low as 20 seconds, the temperature varying inversely with the time. It is desirable to obtain, in the roasted beans, a moisture content within a narrow range so as to permit the development of a maximum amount of soluble coffee solids of acceptable quality, including an increased level of desirable acid character. Generally, the roasted product is improved with respect to its soluble solids content, brew strength, and over-all coffee character, these improvements being the direct result of carrying out the roasting cycle in a short time and at a high temperature, as well as of the use of other conditions, as described herein, which are related to the short roasting cycle.

The invention is eminently suitable for use in roasting whole green coffee beans, which when conventionally roasted have among other characteristics an earthy off-taste and the brew, a reduced earthy off-taste. It has also been unexpectedly found that ground green coffee beans can be roasted by the process to obtain very satisfactory results. Accordingly, as used herein, the term "green coffee beans" refers to either whole or ground green coffee beans. The moisture content of the green beans may range from about 5 to 15% by weight.

The beans may be roasted by disposing them in the form of a bed of varying depth in a suitable column and by introducing hot air into the column at a point below the beans so that the air passes upwardly through them and leaves the column by an opening in the top. It is preferred to introduce the air to the column at such a rate as to buoy up or fluidize the beans but not so great as to cause them to pass out through the top opening. This technique provides a very rapid rate of heat transfer from the hot air to the beans. As noted, instead of hot air, other suitable direct heat exchange fluids such as superheated steam, combustion products of burner gas, nitrogen, carbon dioxide, etc. may be used. The temperature of the hot air is preferably 550 to 750° F., at which levels the air may be passed through the bed of beans for a time interval of about 30 to 90 seconds. If desired, the temperature may range from 450 to 900° F. with a heating time extending from 20 to 180 seconds. More preferred heating conditions are temperatures in the range of 600 to 750° F. at times of 30 to 60 seconds. As will be understood, the temperature varies inversely with the time. Shorter times are preferred because they lead to a higher soluble solids content in the roasted bean. The pressure is variable, but is usually atmospheric.

The roasting time is governed to some extent by the height or depth of the bed of coffee beans. Thus, the greater the static bed depth, the longer the roasting time. For example, a static bed depth of 6 inches may require a roasting time of 60 to 180 seconds with air heated, say, to 550 to 600° F., while a static bed depth of 2 inches can be roasted in about 35 seconds using air heated to 650 to 750° F. It will be understood that the amount of charge will be appropriately chosen to suit the roasting conditions and the column size. The air flow rate is variable but is significantly higher than in conventional roasting.

As the end of the roasting period, it is important to cool the beans quickly as otherwise some of the benefits of the short-time roast may be lost in view of the fact that exothermic reactions take place in the beans. A particularly appropriate cooling step is to substitute cool fluidizing agent for the high temperature fluid used to heat the coffee and thus take advantage of the rapid heat transfer possible with the fluidizing technique. However, any suitable cooling means may be employed such as quenching with cool air, water, air and water, etc.

The moisture content of the roasted beans should be at least 1.5% by weight, preferably 2%, to assure the production in the beans of a certain minimum content of soluble solids which desirably is at least 5% by weight greater than that produced in conventionally roasted beans. The foregoing minimum moisture content of the roasted beans also assures the formation of an increased titratable acidity, amounting to at least 12% more than in the conventionally roasted beans. The final moisture content should not exceed 10% by weight, preferably 4 to 6%, in order to avoid the formation of excess acidity. A soluble solids content of 20% by weight, or more, greater than conventional is obtainable, and the titratable acidity may be 20 or 25% greater than conventional.

The invention may be illustrated by the following example.

EXAMPLE

Three roasts of coffee, having a moisture content of 6.6%, were carried out. In No. 1, a control roast representative of current commercial roasting practice, a one-pound charge of whole green bean coffee was charged to a one-pound roaster comprising a cylinder having means for agitating the beans. The cylinder was adapted to be heated externally by a gas burner and was provided with means, including a blower, for circulating the combustion gases through the coffee. The coffee beans were tumbled within the roasting cylinder while hot air at a temperature in the range of 400 to 500° F., together with the combustion gases, were circulated by the blower through the tumbling bed of coffee. Roasting proceeded for approximately 10 minutes, at which time the desired degree of roast for optimum product quality was reached, and the roasted coffee was air quenched and set aside for evaluation.

In roast No. 2, a one and one-half pound charge of whole green bean coffee was introduced into a vertical section of 4-inch diameter glass pipe approximately 5 feet high. Simultaneously with the introduction of the charge, and throughout the roasting period, hot air heated to about 600° F. was passed through the column at a velocity sufficient to effect and maintain the beans in a state of active fluidization. The actual air velocity was controlled by visual observations at a rate where optimum bean turbulence was produced; generally this was slightly below that rate where elutriation and loss of beans from the roasting section would occur. Under these conditions an optimum roast was obtained in about 2 minutes, and the beans were immediately ejected from the column by a blast of cold air and air quenched.

In roast No. 3, a one-half pound charge of whole green coffee was introduced into the apparatus of No. 2 and roasted in the same way as No. 2 except that an air temperature of 750° F. was maintained. Under these conditions the roast was complete in 35 seconds and was ejected and quenched as before.

The moisture content, atmospherically extractable soluble solids, chlorogenic acid, and titratable acidity of the three roasted batches of beans, were determined and are reported in the table below. Moisture content in percent by weight was determined by drying a weighed sample of the coffee overnight in an air oven maintained at 105° C., then cooling the sample and reweighing. Soluble solids in percent by weight were determined by weighing a ground coffee sample, adding it to water and heating under refluxing conditions, cooling the extract, then centrifuging it, removing water from the extract on a steam bath, drying the extract in a vacuum oven, cooling, and weighing. Chlorogenic acid in percent by weight was determined spectrophotometrically using the method of Moores et al., Anal. Chem. 20, 620 (1948). Titratable acidity was determined by extracting a weighed sample of ground coffee with water at 50° C., titrating the aqueous extract with 0.1 N sodium hydroxide to give a pH of 8.1, as measured by the Beckman pH meter. Titratable acidity is reported in terms of ml. of 0.1 normal base per gram of coffee.

In addition, a standard brew of each roast was made by dissolving 57.5 gr. of coffee in 1 liter of water and the pH and cup solids of the brews were determined, with the results appearing in the table. The pH of the brews were determined on a Beckman pH meter. Cup solids were determined by the method set forth in A.O.A.C., VIII ed., 29.8, p. 533.

It may be noted that the data in the table represent the average of several determinations; that is, each of the several roasts was repeated a number of times, and the test results were averaged.

roasting. Note roast Nos. 2 and 3 which respectively had 40% and 150% more moisture in the roasted bean than the control. The greater moisture content, in turn, permits the development of an increased amount of soluble coffee solids, the increase being up to 18%, as shown by the example, and increases of up to 20% or more being possible. These increases represent savings to the consumer in his use of brewed coffee. As is also apparent, there is less loss of volatiles in the present method than in conventional roasting where the beans are exposed to high temperature conditions for long periods.

The roasted beans not only have improved blending potential but are useful per se to make regular brews of coffee. In addition, they are suitable for making soluble coffee, that is, coffee powder which dissolves instantly on the addition of hot water.

When ground beans are employed, they may be ground in a coffee grinder or other coarse grinding device. Satisfactory results have been obtained using a Fitzpatrick mill with screens as fine as number 4B. In addition to whole beans and ground beans, satisfactory results may be obtained with cracked or flaked beans which have passed through flaking rolls.

Referring to the roasting conditions, it will be understood that by roasting at the temperatures and for the times noted, a complete roast can be carried out. If desired, however, a roast may be performed to achieve a particular color in the roasted coffee, ranging say from light to dark and including any desired intermediate shade. Of interest in this connection is the fact that by roasting coffee, both by the present method and the conventional method noted above, so that the colors of the roasted coffees approximated each other, it was found that the present method gave a coffee having less burnt flavor, par-

*Table 1*

| No. | Roast Time | Water, Percent | Soluble Solids, Percent | Chlorogenic Acid, Percent | Titratable Acidity, ml. 0.1 N NaOH/gm. | pH of Standard Drip Brew | Cup Solids Standard Brew, gms./100 ml. |
|---|---|---|---|---|---|---|---|
| 1 | 10 min | 1.2 | 28.4 | 5.6 | 1.87 | 5.25 | 1.85 |
| 2 | 2 min | 2.0 | 31.6 | 5.4 | 2.3 | 5.10 | 1.90 |
| 3 | 35 sec | 3.0 | 33.6 | 6.4 | 2.1 | 5.00 | 2.13 |

As is apparent, Nos. 2 and 3 gave roasted coffees having a higher soluble solids content than that of the control, No. 1. In No. 3, the soluble solids content was approximately 18% higher than in No. 1, and in No. 2 it was approximately 11% higher. The titratable acidity was 23% higher than the control for No. 2 and 12% higher for No. 3. Further, the pH of the resulting brew is 5.0 for No. 3 and can be seen to approach 5.0 for No. 2, a significant result when it is recalled that the average pH of good commercial coffee is 4.9. Nos. 2 and 3 show improvement in the cup solids content of the brew, the former being approximately 3% greater than conventional and the latter 15% greater. Since the cup strength or body of the brew increases with the cup solids, it is apparent that the cup strength of the brews of Nos. 2 and 3 is improved, a fact also noted by taste tests. Taste, of course, is the primary criterion for evaluating the product. The earthy off-taste was less in Nos. 2 and 3 than in No. 1.

Of interest is the fact that the chlorogenic acid content of roast No. 3 was higher than that of the control, indicating that a lesser amount of this acid was being degraded; in other words, the shorter roast time was permitting more of the acid to remain in the bean. It is believed to be desirable to preserve this acid.

As may be apparent, the short-time, high-temperature roasting of whole green coffee enables the beans to retain a higher average moisture content than in conventional ticularly when both methods were used to produce a heavily roasted coffee, i.e., one having a dark color.

It will be understood that any suitable techniques of disposing the coffee in the heating zone and of heating it may be used so long as they enable the coffee to be roasted in the short times described and to retain a moisture content within the ranges noted.

The present invention is a continuation-in-part of Serial No. 811,817, filed May 8, 1959, now abandoned, and Serial No. 164,609, filed January 5, 1962, now abandoned.

The invention is not restricted to the specific details above set forth but is capable of obvious variations thereof without departing from its scope.

In the light of the foregoing description, the following is claimed:

1. Process for roasting green coffee beans at an increased rate and coincidently increasing the acidity of said beans by comparison with the product obtained by conventional roasting of the same; said beans, when conventionally roasted, being characterized by producing a brew having, among other characteristics, an earthy off-taste; which comprises charging green beans having a moisture content of 5 to 15% by weight to a column to dispose the same in a body of substantial depth; passing through the charge of beans heated air having a temperature of 550° to 750° F. for a time of 30 to 90 seconds and at substantially atmospheric pressure to roast the beans, said temperature varying inversely with said time, passing said air through the beans at a rate sufficient to fluidize the same, said air comprising the sole means of heating the coffee beans; maintaining in the beans during said roasting time a moisture content of at least 2% and not exceeding 6% by weight, thereby to produce in the roasted beans an increased titratable acidity amounting to at least 12% more than in said conventionally roasted beans, then quickly terminating the roasting by cooling the beans; and recovering roasted beans which are superior to said conventionally roasted beans (a) by having a soluble solids content of up to 20% by weight higher, (b) by producing a brew having an increased cup solids content of up to 15% by weight greater, (c) a correspondingly improved cup strength, and (d) a more acid pH approximating 5.0; and said brew having a reduced earthy off-taste.

2. Process for roasting green coffee beans at an increased rate and coincidently increasing the acidity of said beans by comparison with the product obtained by conventional roasting of the same; said beans, when conventionally roasted, being characterized by producing a brew having, among other characteristics, an earthy off-taste; which comprises charging green beans to a column to dispose the same in a body of substantial depth; passing through the charge of beans heated air having a temperature of 450° to 900° F. for a time of 20 to 180 seconds and at substantially atmospheric pressure to roast the beans, said temperature varying inversely with said time, passing said air through the beans at a rate sufficient to fluidize the same, said air comprising the sole means of heating the coffee beans; maintaining in the beans during said roasting time a moisture content of at least 1.5% and not exceeding 10% by weight, thereby to produce in the roasted beans an increased titratable acidity amounting to at least 12% more than in said conventionally roasted beans, then quickly terminating the roasting by cooling the beans; and recovering roasted beans which are superior to said conventionally roasted beans (a) by having a soluble solids content of up to 20% by weight higher, (b) by producing a brew having an increased cup solids content of 3 to 15% by weight greater, (c) a correspondingly improved cup strength, and (d) a more acid pH; and said brew having a reduced earthy off-taste.

3. Process for roasting green coffee beans at an increased rate and coincidently increasing the acidity of said beans by comparison with conventional roasting of the same; said beans, when conventionally roasted, being characterized by producing a brew having an earthy off-taste; which comprises charging green beans to a heating zone, passing through the charge of beans in direct heat exchange relation therewith a gaseous heating fluid having a temperature of 450° to 900° F. for a time of 20 to 180 seconds to roast the beans, said heating fluid comprising the sole means of heating the coffee beans, said temperature varying inversely with said time, passing said heated fluid through the beans at a rate sufficient to fluidize the same, maintaining in the beans during said roasting time a moisture content of at least 1.5% but not exceeding 10% by weight, then quickly terminating the roasting by cooling the beans; and recovering roasted beans which by comparison with said conventionally roasted beans (a) have an increased titratable acidity, (b) have a higher soluble solids content, (c) produce a brew having a greater cup solids content, and (d) a more acid pH; and said brew having a reduced earthy off-taste.

References Cited in the file of this patent

UNITED STATES PATENTS

| | | |
|---|---|---|
| 2,464,421 | Torres | Mar. 15, 1949 |
| 2,497,501 | Himmel et al. | Feb. 14, 1950 |
| 2,505,325 | Hubbard | Apr. 25, 1950 |